(12) United States Patent
Minagoshi et al.

(10) Patent No.: US 7,728,060 B2
(45) Date of Patent: Jun. 1, 2010

(54) CONDUCTIVE ROLLER OF RUBBER, THERMOPLASTICS, EO-PO-GLYCIDYL ETHER, FLUORO AND SULFONYL ANION SALT AND MICROCAPSULE

(75) Inventors: Akira Minagoshi, Hyogo (JP); Kei Tajima, Hyogo (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 446 days.

(21) Appl. No.: 11/892,492

(22) Filed: Aug. 23, 2007

(65) Prior Publication Data

US 2008/0071028 A1 Mar. 20, 2008

(30) Foreign Application Priority Data

Sep. 15, 2006 (JP) .............................. 2006-250179

(51) Int. Cl.
*C08K 5/16* (2006.01)
*C08K 5/43* (2006.01)
*C08K 9/10* (2006.01)
*C08L 9/00* (2006.01)
*C08L 9/02* (2006.01)
*C08L 9/06* (2006.01)
*F16C 13/00* (2006.01)
*G03G 15/14* (2006.01)

(52) U.S. Cl. .......................... 524/167; 399/176; 492/56; 523/205; 524/168; 525/92 B; 525/92 C; 525/92 D; 525/92 F; 525/92 L; 525/98; 525/125; 525/133; 525/166; 525/179; 525/216; 525/218; 525/221; 525/226; 525/227

(58) Field of Classification Search ....................... None
See application file for complete search history.

(56) References Cited

U.S. PATENT DOCUMENTS

| 2001/0016629 A1* | 8/2001 | Mori et al. ............... 525/332.8 |
| 2004/0135129 A1 | 7/2004 | Hattori et al. |
| 2004/0220301 A1* | 11/2004 | Hattori et al. ............... 524/155 |

FOREIGN PATENT DOCUMENTS

| JP | 2004-51829 A | | 2/2004 |
| JP | 2004-269854 A | | 9/2004 |
| JP | 2005-82620 A | * | 3/2005 |

OTHER PUBLICATIONS

Matsumoto Microspheres F-series product data sheet, 2009, three pages.*

* cited by examiner

*Primary Examiner*—Robert Sellers
(74) *Attorney, Agent, or Firm*—Birch, Stewart, Kolasch & Birch, LLP (57) ABSTRACT

A rubber component containing at least one of diene rubber and ethylene-propylene-diene rubber is dynamically crosslinked. Thereby the rubber component is dispersed in a mixture of a thermoplastic elastomer and a thermoplastic resin. An ethylene oxide-propylene oxide-allyl glycidyl ether and an anion-containing salt having fluoro groups and sulfonyl groups are added to the elastomer composition to obtain a conductive dynamically crosslinked thermoplastic elastomer composition. A mixture of the obtained conductive dynamically crosslinked thermoplastic elastomer composition and a micro-capsule composed of a polymer, having acrylic groups, which forms an outer shell thereof is molded to obtain a conductive roller having Shore A hardness specified in JIS K6253 not more than 40 measured at 23° C.

10 Claims, 1 Drawing Sheet

Fig. 1

CONDUCTIVE ROLLER OF RUBBER, THERMOPLASTICS, EO-PO-GLYCIDYL ETHER, FLUORO AND SULFONYL ANION SALT AND MICROCAPSULE

This nonprovisional application claims priority under 35 U.S.C. §119(a) on Patent Application No(s). 2006-250179 filed in Japan on Sep. 15, 2006, the entire contents of which are hereby incorporated by reference.

BACKGROUND OF THE INVENTION

1. Field of the Invention

The present invention relates to a conductive roller, and more particularly to a conductive roller preferably which is preferably used as a transfer roller in an image-forming apparatus including OA equipment such as an ink jet printer, a laser printer, an electrostatic copying machine, a facsimile apparatus, and the like and an automatic teller machine (ATM).

2. Description of the Related Art

It is necessary for the conductive roller such as a transfer roller, a driving roller, a developing roller, a charging roller, and the like to have an appropriately stable electric resistance value.

As conventional methods of imparting conductivity to the conductive roller of this kind, the following two methods are conventionally used: In one known method, an electroconductive polymer composition containing a conductive filler such as powder of metal oxides, carbon black or the like in a polymer thereof is used. In the other known method, an ionic-conductive polymer composition such as urethane rubber, acrylonitrile butadiene rubber, epichlorohydrin rubber or the like is used.

In the case where the electroconductive polymer composition is used for a conductive roller, there is a region in which the electric resistance of the conductive roller changes rapidly owing to a slight change of an addition amount of the conductive filler. Thus it is very difficult to control the electric resistance of the conductive roller. In addition, because it is difficult to uniformly disperse the conductive filler in the polymer, the electric resistance value has variations in the circumferential and widthwise directions of the conductive roller.

The electric resistance value of the conductive roller using the electroconductive polymer composition depends on a voltage applied thereto. In particular, in the case where the carbon black is used as the conductive filler, the electric resistance value of the conductive roller depends greatly on the voltage applied thereto.

Further when the electroconductive polymer composition contains a very large amount of the conductive filler such as the carbon black, it is difficult to mold the electroconductive polymer composition.

The conductive roller using the electroconductive polymer composition has the above-described problems. Recently, a high-quality image forming technique including a digital image processing technique and color image processing technique has remarkably progressed. Thus there is a tendency that the ionic-conductive polymer composition is used preferentially to the electroconductive polymer composition.

Mostly the ionic-conductive polymer composition is used as a vulcanized rubber composition to form the conductive roller. But the vulcanized rubber composition is not thermoplastic and cannot be recycled.

When a conventional ionic-conductive agent is used, it is difficult to effectively decrease the electric resistance of the conductive roller. When a large amount of the ionic-conductive agent is contained in the polymer composition, bleeding occurs and mechanical properties of the composition composing the conductive roller such as the compression set, hardness, and the like deteriorate.

To overcome the above-described problem, the present inventors developed a conductive polymer composition which has rubber-like durability, elasticity, and flexibility, and resin-like moldability, is recyclable, and has a low electric resistance.

More specifically, as disclosed in Japanese Patent Application Laid-Open Nos. 2004-51829 (patent document 1) and 2004-269854 (patent document 2), the present inventors proposed the conductive dynamically crosslinked thermoplastic elastomer composition which is formed by adding the polymer having the ether or ester structure and the anion-containing salt having the fluoro group and the sulfonyl group to the elastomer composition in which the crosslinkable rubber or/and the thermoplastic elastomer are dynamically crosslinked and dispersed in the thermoplastic resin or/and the thermoplastic elastomer. They also proposed the conductive roller composed of the conductive dynamically crosslinked thermoplastic elastomer composition.

The above-described conductive roller does not have any problems when it is used in the neighborhood of a normal temperature. However, the hardness of the conductive roller is a little high. Thus when the conductive roller is used in a low-temperature environment as a transfer roller, the conductive roller causes the adhesiveness of toner to paper to decrease. Thereby there is a fear that a defective image is generated because the toner is not exactly transferred to the paper. Thus the above-described dynamically crosslinked thermoplastic elastomer composition leaves improvement for keeping the hardness thereof low in the low-temperature environment.

Patent document 1: Japanese Patent Application Laid-Open No. 2004-51829

Patent document 2: Japanese Patent Application Laid-Open No. 2004-269854

SUMMARY OF THE INVENTION

The present invention has been made in view of the above-described problems. Therefore it is an object of the present invention to provide a conductive roller which is capable of keeping the hardness thereof low even in a low-temperature environment, has a favorable moldability and recycling property, is capable of realizing a sufficiently low electric resistance even a small amount of addition of a salt to a composition composing the conductive roller, and is capable of preventing migration pollution and deterioration of properties of the conductive roller by not using a large amount of the salt.

To achieve the object, the present invention provides a conductive roller produced by molding a composition including an elastomer composition composed of a rubber component containing at least one of diene rubber and ethylene-propylene-diene rubber and a mixture of a thermoplastic elastomer and a thermoplastic resin, in which the rubber component is dynamically crosslinked and dispersed; an ethylene oxide-propylene oxide-allyl glycidyl ether and an anion-containing salt having fluoro groups and sulfonyl groups, both of which are added to the elastomer composition to form a conductive dynamically crosslinked thermoplastic elastomer composition; and a micro-capsule composed of a polymer, having acrylic groups, which forms an outer shell thereof, the micro-capsule being mixed with the conductive dynamically crosslinked thermoplastic elastomer composition. Shore A hardness of the conductive roller specified in JIS K6253 is not more than 40 at 23° C.

Regarding the invention described in the patent documents 1 and 2, to decrease the hardness of the conductive dynamically crosslinked thermoplastic elastomer composition in a low-temperature environment, the present inventors have made experiments energetically by changing the kind of the thermoplastic resin and the like. As a result, they have found that although the hardness of the composition can be decreased, the processability deteriorates. Thus they have made further investigations to reduce the hardness thereof in the low-temperature environment without deteriorating the processability and completed the present invention.

The Shore A hardness the conductive roller of the present invention specified in JIS K6253 is not more than 40 at 23° C. If the Shore A hardness is more than 40, the hardness of the conductive roller becomes high when it is used at temperatures not more than 15° C. Thereby there is a possibility that a defective image is generated. Although the lower limit value of the Shore A hardness is not limited to a specific value, the Shore A hardness is set to favorably not less than 15. If the Shore A hardness is less than 15, the conductive roller is so soft that the compressive strain thereof becomes too high.

Description is made on the composition composing the conductive roller of the present invention is capable of keeping the hardness thereof low even in a low-temperature environment.

As described above, the elastomer composition contains at least one of the diene rubber and the ethylene-propylene-diene rubber (EPDM rubber).

As the diene rubber, it is possible to list natural rubber (NR), butyl rubber (IIR), isoprene rubber (IR), butadiene rubber (BR), styrene-butadiene rubber (SBR), chloroprene rubber (CR), acrylonitrile-butadiene rubber (NBR), and 1,2-polybutadiene. These rubbers may be used singly or in combination.

The EPDM rubber includes the oil-unextended type consisting of a rubber component and the oil-extended type containing the rubber component and oil. Both types can be used in the present invention. As examples of diene monomers of the EPDM rubber, dicyclopentadiene, methylene norbornene, ethylidene norbornene, 1,4-hexadiene, and cyclooctadiene are listed.

The rubber component may contain rubber other than the diene rubber and the EPDM rubber. As the other rubber, ethylene propylene rubber, acrylic rubber, and chlorosulfonated polyethylene are listed.

It is preferable that the elastomer composition essentially contains the EPDM rubber as its rubber component. The content of the EPDM rubber to the entire rubber component is set to favorably not less than 50 mass %, more favorably not less than 80 mass %, and most favorably not less than 95 nor more than 100 mass %. The reason the EPDM rubber to the entire rubber component is set is as above is as follows: The main chain of the EPDM consists of saturated hydrocarbon and does not contain double bonds. Thus even though the EPDM is exposed to high-concentration ozone atmosphere or irradiated with light for a long time, the molecular main chain is hardly cut off. Therefore the conductive roller of the present invention has a high weatherability.

The elastomer composition contains the mixture of the thermoplastic elastomer and the thermoplastic resin. It is desirable that the mixture of the thermoplastic elastomer and the thermoplastic resin is an elastomer because the elastomer composition obtained by dispersing the rubber component in the mixture has a low hardness.

The mixing ratio between the thermoplastic elastomer and the thermoplastic resin can be determined appropriately according to the kind of an elastomer and a resin used. The mixing amount of the thermoplastic resin is favorably not less than 1 part by mass nor more than 100 parts by mass for 100 parts by mass of the thermoplastic elastomer. If the mixing amount of the thermoplastic resin is less than one part by mass for 100 parts by mass of the thermoplastic elastomer, it is impossible to obtain the effect of mixing the thermoplastic resin with the thermoplastic elastomer. On the other hand, if the mixing amount of the thermoplastic resin is more than 100 part by mass for 100 parts by mass of the thermoplastic elastomer, the mixture of the thermoplastic elastomer and the thermoplastic resin is not an elastomer. The mixing amount of the thermoplastic resin is more favorably in the range of 20 to 80 parts by mass for 100 parts by mass of the thermoplastic elastomer.

As the thermoplastic elastomer, known thermoplastic elastomers can be used.

More specifically, it is possible to list a styrene elastomer, chlorinated polyethylene, a vinyl chloride elastomer, an olefin elastomer, a urethane elastomer, an ester elastomer, and an amide elastomer.

Of the above-described thermoplastic elastomers, it is preferable to use the styrene elastomer.

As the styrene elastomer, it is possible to exemplify a copolymer block composed of a polymer block (A) containing the styrene monomer as its main component and a block (B) containing a conjugated diene compound as its main component and a hydrogenated conjugated diene polymer unit of the block copolymer. As the styrene monomer, it is possible to list styrene, α-methylstyrene, vinyl toluene, and t-butylstyrene. These styrene monomers can be used singly or in combination of not less than two kinds thereof. It is especially preferable to use the styrene as the styrene monomer. As the conjugated diene compound, it is possible to list butadiene, isoprene, chloroprene, and 2,3-dimethylbutadiene. These conjugated diene compounds may be used singly or in combination of not less than two kinds thereof.

As the styrene elastomer, it is possible to list a styrene-butadiene-styrene copolymer (SBS), a styrene-isoprene-styrene copolymer (SIS), a styrene-ethylene/butylene-styrene copolymer (SEBS), a styrene-ethylene/propylene-styrene copolymer (SEPS), and a styrene-ethylene-ethylene/propylene-styrene copolymer (SEEPS).

It is more favorable to use a hydrogenated styrene thermoplastic elastomer as the styrene elastomer. It is especially favorable to use the styrene-ethylene-ethylene/propylene-styrene copolymer (SEEPS).

As the thermoplastic resin, it is possible to use known thermoplastic resins. As the thermoplastic resin, it is possible to exemplify olefin resin, polystyrene (PS), polyethylene terephthalate (PET), polybutylene terephthalate (PBT), nylon, and the like. It is especially preferable to use the olefin resin. As the olefin resin, it is possible to list polyethylene, polypropylene, ethylene ethyl acrylate resin, ethylene vinyl acetate resin, ethylene-methacrylate resin, and ionomer resin. Of these olefin resins, it is favorable to use the polypropylene or the polyethylene. It is more favorable to use the polypropylene.

It is preferable that the elastomer composition contains 2 to 150 parts by mass of the mixture of the thermoplastic elastomer and the thermoplastic resin for 100 parts by mass of the rubber component.

If the mixing amount of the mixture is less than two parts by mass, it is impossible to disperse the rubber component in the resin matrix and thus difficult to process the mixture and in addition the conductive roller of the present invention has a low strength and wear resistance. On the other hand, the mixing amount of the mixture is more than 150 parts by mass, the conductive roller has a high hardness and there is a possibility that defective transfer and transport occurs.

To dynamically crosslink the rubber component, normally a crosslinking agent is used. Although it is possible to use known crosslinking agents such as resin crosslinking agents or peroxides, it is preferable to use the resin crosslinking agent.

The resin crosslinking agent is a synthetic resin by which the rubber component has a crosslinking reaction when the rubber component is heated. Compared with sulfur and a vulcanization accelerator which are used in combination, the resin crosslinking agent is preferable in that by the use of the resin crosslinking agent, blooming hardly occurs, and an obtained product has a low compression set, deteriorates to a low degree in the properties thereof, maintains a high accuracy, and is durable. Further the resin crosslinking agent allows the crosslinking period of time to be shorter than a sulfur crosslinking agent. Thus the resin crosslinking agent allows the dynamic crosslinking to proceed in a short period of time while the rubber component stays in an extruder.

As the resin crosslinking agent, phenol resin, melamine-formaldehyde resin, triazine.formaldehyde condensate, hex-amethoxymethyl.melamine resin can be used. It is favorable to use the phenol resin.

As examples of the phenol resin, it is possible to use phenol resins synthesized by reaction of phenols such as phenol, alkylphenol, cresol, xylenol, and resorcin with aldehydes such as formaldehyde, acetic aldehyde, and furfural. It is possible to use halogenated phenol resin in which at least one halogen atom is linked with the aldehyde unit of the phenol resin.

It is preferable to use alkylphenol.formaldehyde resin resulting from reaction of the formaldehyde with the alkylphenol having an alkyl group connected to the ortho position or the para position of benzene, because the alkylphenol.formaldehyde resin is compatible with rubber and reactive, thus making a crosslinking reaction start time comparatively early. The alkyl group of the alkylphenol.formaldehyde resin has 1-10 carbon atoms. Methyl group, ethyl group, propyl group, and butyl group are exemplified as the alkyl group. Halides of the alkylphenol.formaldehyde resin can be preferably used.

As the resin crosslinking agent, it is possible to use modified alkylphenol resin formed by addition condensation of para-tertiary butyl phenol sulfide and aldehydes and alkypheno.sulfide resin.

It is favorable that the mixing amount of the resin crosslinking agent is set to favorably not less than two nor more than 20 parts by mass for 100 parts by mass of the rubber component. If the mixing amount of the resin crosslinking agent is less than two parts by mass, crosslinking is insufficiently performed. Thus the obtained composition has a low wear resistance. On the other hand, if the mixing amount of the resin crosslinking agent is more than 20 parts by mass, there is a possibility that the conductive roller of the present invention composed of the composition has a very high hardness. It is more favorable that the mixing amount of the resin crosslinking agent is set to not less than five nor more than 15 parts by mass for 100 parts by mass of the rubber component.

A crosslinking assistant may be used to accomplish the dynamic crosslinking reaction properly. Metal oxides are used as the crosslinking assistant. As the metal oxides, zinc oxide and zinc carbonate are preferable.

The mixing amount of the crosslinking assistant for 100 parts by mass of the rubber component is set to favorably not less than 0.5 nor more than 10 parts by mass and more favorably not less than 0.5 nor more than five parts by mass.

As the peroxides, it is possible to use compounds capable of crosslinking the rubber component. For example, it is possible to list benzoyl peroxide, 1,1-bis(tert-butyl peroxy)-3,3,5-trimethylcyclohexane, 2,5-dimethyl-2,5-di(benzoyl peroxy)hexane, di(tert-butyl peroxy)di-isopropylbenzene, 1,4-bis[(tert-butyl)peroxy isopropyl]benzene, di(tert-butyl peroxy)benzoate, tert-butyl peroxybenzoate, dicumyl peroxide, tert-butyl cumyl peroxide, 2,5-dimethyl-2,5-di(tert-butyl peroxy)hexane, di-tert-butyl peroxide, and 2,5-dimethyl-2,5-di(tert-butyl peroxy)-3-hexene. These peroxides may be used singly or in combination of two or more kinds thereof.

It is favorable that the mixing amount of the peroxide is set to 0.2 to 3.0 parts by mass for 100 parts by mass of the rubber component. If the mixing amount of the peroxide is set to less than 0.2 parts by mass, the rubber component is insufficiently crosslinked. Thus the obtained composition has an inferior wear resistance. On the other hand, if the mixing amount of the peroxide exceeds 3.0 parts by mass, the physical property thereof deteriorates because molecules are cut off and in addition a defective dispersion occurs. Therefore it is difficult to process the composition.

The lower limit value in the mixing amount of the peroxide is set to more favorably not less than 0.5 parts by mass and most favorably not less than 1.0 part by mass for 100 parts by mass of the rubber component. The upper limit value in the mixing amount of the peroxide is set to more favorably not more than 2.5 parts by mass and most favorably not more than 2.0 parts by mass for 100 parts by mass of the rubber component.

A co-crosslinking agent may be used together with the peroxide. The co-crosslinking agent crosslinks itself and reacts with molecules of rubber and crosslinks them, thus making the entire elastomer composition polymeric. By co-crosslinking the rubber component with the co-crosslinking agent, it is possible to increase the molecular weight of molecules to be crosslinked and the wear resistance of the elastomer composition.

As the co-crosslinking agent, it is possible to list polyfunctional monomers, metal salts of methacrylic acid or acrylic acid, methacrylate ester, aromatic vinyl compounds, heterocyclic vinyl compounds, allyl compounds, polyfunctional polymers utilizing the functional group of 1,2-polybutadiene, and dioximes.

When the co-crosslinking agent is added to the rubber component together with the peroxide, the mixing amount of the co-crosslinking agent can be selected appropriately in relation to the kind of the co-crosslinking agent or other components to be used. The mixing amount of the co-crosslinking agent is set to favorably not less than 5 nor more than 20 parts by mass and more favorably not less than 10 nor more than 15 parts by mass for 100 parts by mass of the rubber component.

The ethylene oxide-propylene oxide-allyl glycidyl ether (hereinafter referred to as "EO-PO-AGE copolymer") and the anion-containing salt having the fluoro group and the sulfonyl group are added to the elastomer composition to obtain the conductive dynamically crosslinked thermoplastic elastomer composition.

By adding the EO-PO-AGE copolymer and the anion-containing salt having the fluoro group and the sulfonyl group to the elastomer composition, the EO-PO-AGE copolymer stabilizes ions derived from the anion-containing salt having the fluoro group and the sulfonyl group and provides an outstanding effect of decreasing the electric resistance value of the conductive dynamically crosslinked thermoplastic elastomer composition.

The content ratio of the ethylene oxide in the EO-PO-AGE copolymer is favorably not less than 55 mol % nor more than 95 mol % and more favorably not less than 65 mol % nor more than 95 mol %.

Metal cations derived from the salt are stabilized by the ethylene oxide unit and the propylene oxide unit. The ethylene oxide unit has a higher performance than the propylene oxide unit in stabilizing the metal cations. Thus by setting the content ratio of the ethylene oxide unit higher than that of the propylene oxide unit, a large number of ions can be stabilized. If the content ratio of the ethylene oxide unit is more than 95 mol %, the ethylene oxide unit crystallizes.

In the EO-PO-AGE copolymer, it is preferable to set the copolymerization ratio of the allyl glycidyl ether to not less than 1 mol % nor more than 10 mol %. If the copolymerization ratio of the allyl glycidyl ether is less than 1 mol %, bleeding is liable to occur and a photoreceptor is liable to be polluted. On the other hand, if the copolymerization ratio thereof is more than 10 mol %, the tensile strength, fatigue property, and bending resistance of the obtained composition are liable to deteriorate.

The number-average molecular weight of the EO-PO-AGE copolymer is favorably not less than 10000 and more favorably not less than 30000 to prevent bleeding and blooming from occurring and the photoreceptor from being polluted.

The EO-PO-AGE copolymer may be dynamically crosslinked. The EO-PO-AGE copolymer is crosslinked simultaneously with the crosslinking of the rubber component of the elastomer composition or separately from the crosslinking of the rubber component of the elastomer composition.

Known crosslinking agents such as the resin crosslinking agent, the peroxide, and the like can be used. It is preferable to use the peroxide.

It is preferable to add 1 to 30 parts by mass of the EO-PO-AGE copolymer to 100 parts by mass of the rubber component. If the mixing amount of the EO-PO-AGE copolymer is less than 1 part by weight, it is impossible to provide the obtained composition with a sufficient conductive performance. On the other hand, if the mixing amount of the EO-PO-AGE copolymer is more than 30 parts by mass, there is a possibility that the processability deteriorates and the production cost is high.

As the anion-containing salt having the fluoro group and the sulfonyl group, a salt having at least one anion selected from the group consisting of chemical formulas 1, 2, and 3 shown below is preferable.

Chemical formula 1 where $X_1$ and $X_2$ are identical to each other or different from each other and show functional groups containing carbon atoms, fluorine atoms, a sulfonyl group ($-SO_2-$). The number of carbon atoms is one to eight.

Chemical formula 2 where $X_3$ shows functional groups containing carbon atoms, fluorine atoms, and sulfonyl groups ($-SO_2-$). The number of carbon atoms is one to eight.

Chemical formula 3 where $X_4$, $X_5$, and $X_6$ are identical to each other or different from each other and show functional groups containing carbon atoms, fluorine atoms, and sulfonyl groups ($-SO_2-$). The number of carbon atoms is one to eight.

The electric charge of the anion-containing salt is not locally present by a strong electron attraction effect of the fluoro group and the sulfonyl group. Thus anions are stabilized and show a high dissociation degree in the composition. Thereby a high ionic conductivity can be realized. Therefore owing to the addition of a small amount of the anion-containing salt to the elastomer composition, it is possible to reduce the electric resistance value of the obtained composition without greatly reducing values indicating various properties of the obtained composition. Further unlike carbon black, the anion-containing salt does not change into black when it is added to the elastomer composition. Thus the anion-containing salt is applicable to uses which require transparency and coloring.

The number of carbon atoms of the functional groups shown by $X_1$ to $X_6$ in the chemical formulas 1, 2, and 3 is one to eight, but is favorably one to four and more favorably one to two to obtain a higher dissociation degree.

The functional groups $X_1$ through $X_6$ include a group shown by $R-SO_2-$ (R shows hydrocarbon group, having 1 to 8 carbon atoms, which is substituted with fluorine atom).

As the hydrocarbon group having 1 to 8 carbon atoms, it is possible to list alkyl group such as methyl group, ethyl group, n-propyl group, isopropyl group, n-butyl group, isobutyl group, tert-butyl group, n-pentyl group, isopentyl group, tert-pentyl group, n-hexyl group, and 1,1-dimethylpropyl group; alkenyl group such as vinyl group, aryl group, 1-propenyl group, isopropenyl group, 2-butenyl group, 1,3-butadienyl group, and 2-pentenyl group; and alkynyl group such as ethynyl group, 2-propynyl group, 1-butynyl group, and 2-butynyl group. The number of fluorine atoms serving as a substituting group and a substituting position are not specifically limited, provided that they fall in the range chemically permitted.

It is preferable that the functional groups $X_1$ through $X_6$ have a structure shown by $C_nH_mF_{(2n-m+1)}-SO_2-$ (n shows integers not less than one nor more than eight, and m shows integers not less tan 0 nor more than 16) in view of the stability, the manufacturing cost and the handling of the anion.

It is preferable that cations which make a pair with anions having the fluoro group and the sulfonyl group to form salts are any one of cations of the alkali metals, the group 2A metals, and transition metals, and amphoteric metals. The alkali metals are more favorable than the other metals in that alkali metals have small ionization energy and are capable of readily forming stable cations. Of the alkali metals, lithium ion having a high conductivity is especially preferable.

In addition to the metal cations, cations shown by the following chemical formulas 4 and 5 can be used.

Chemical formula 4 where $R_{11}$-$R_{14}$ show alkyl group, identical to each other or different from each other, which has 1 to 20 carbon atoms and is allowed to have substituting group.

Chemical formula 5 where $R_{15}$ and $R_{16}$ show alkyl group, identical to each other or different from each other, which has 1 to 20 carbon atoms and is allowed to have substituting group.

As "alkyl group which has 1 to 20 carbon atoms and is allowed to have substituting group" shown by $R_{11}$-$R_{16}$, it is possible to list methyl, ethyl, n-propyl, i-propyl, n-butyl, i-butyl, t-butyl, n-pentyl, n-hexyl, and n-decyl.

As the substituting group, it is possible to list halogen (preferably fluorine, chlorine, bromine), oxo group, alkylene oxide group, alkanoyl group (preferably $C_{1-8}$), alkanoyl oxy group (preferably $C_{1-8}$), alkanoyl amino group (preferably $C_{1-8}$), carboxyl group, alkoxycarbonyl group (preferably $C_{2-8}$), haloalkyl carbonyl group (preferably $C_{2-8}$), alkoxy group (preferably $C_{1-8}$), haloalkoxy group (preferably $C_{1-8}$), amino group, alkylamino group (preferably $C_{1-8}$), dialkylamino group (preferably $C_{2-16}$), cyclic amino group, alkylamino carbonyl group (preferably $C_{2-8}$), carbamoyl group, hydroxyl group, nitro group, cyano group, mercapto group, alkylthio group (preferably $C_{1-8}$), alkylsulfonyloxy group (preferably $C_{1-8}$), alkylsulfonylamino group (preferably $C_{1-8}$), and phenyl group.

As the cation shown in the chemical formula 4, a cation of trimethyl-type quaternary ammonium having alkyl group, having 4 to 20 carbon atoms, in which three of $R_{11}$ through $R_{14}$ are methyl group and one of $R_{11}$ through $R_{14}$ may have a substituting group. The cation of trimethyl-type quaternary ammonium are capable of stabilizing the positive electric charge of nitrogen atoms owing to the three methyl groups having strong electron-donating property and in addition, capable of improving compatibility of the anion-containing salt with other components owing to the presence of the alkyl groups, having 4 to 20 carbon atoms, which may have the substituting group.

The higher the electron-donating performance of $R_{15}$ or $R_{16}$ is, the higher the positive electric charge of the nitrogen atoms can be stabilized. Thereby the cation shown by the chemical formula 5 has a higher stability and a higher dissociation degree to form the salt superior in conductivity-imparting performance. Therefore the alkyl group $R_{15}$ or $R_{16}$ is favorably an electron-donating group and more favorably the methyl group or the ethyl group.

As the anion-containing salt having the fluoro group and the sulfonyl group, bis(trifluoromethanesulfonyl)imide lithium(($CF_3SO_2)_2$NLi), bis(trifluoromethanesulfonyl)imide potassium(($CF_3SO_2)_2$NK), and lithium trifluorosulfonate ($CF_3SO_3Li$) are preferable. These salts are very stable at high temperatures. Therefore different from the perchlorate conventionally used, it is unnecessary to take an explosion-proof measure. Further these salts little deteriorate other properties of the composition and are excellent in decreasing the electric resistance thereof at a low temperature and humidity. In this respect, these salts are superior in that by using them, it is possible to reduce the manufacturing cost and secure safety. Thus these salts are allowed to have a high performance as the ionic-conductive agent.

In addition, the following salts are preferable as the anion-containing salt having the fluoro group and the sulfonyl group: $(C_2F_5SO_2)_2NLi$, $(C_4F_9SO_2)(CF_3SO_2)NLi$, $(FSO_2C_6F_4)(CF_3SO_2)NLi$, $(C_8F_{17}SO_2)(CF_3SO_2)NLi$, $(CF_3CH_2OSO_2)_2NLi$, $(CF_3CF_2CH_2OSO_2)_2NLi$, $(HCF_2CF_2CH_2OSO_2)_2NLi$, $((CF_3)_2CHOSO_2)_2NLi$, $(CF_3SO_2)_3CLi$, $(CF_3CH_2OSO_2)_3CLi$, $C_4F_9SO_3Li$, $(C_2F_5SO_2)_2NK$, $(C_4F_9SO_2)(CF_3SO_2)NK$, $(FSO_2C_6F_4)(CF_3SO_2)NK$, $(C_8F_{17}SO_2)(CF_3SO_2)NK$, $(CF_3CH_2OSO_2)_2NK$, $(CF_3CF_2CH_2OSO_2)_2NK$, $(HCF_2CF_2CH_2OSO_2)_2NK$, $((CF_3)_2CHOSO_2)_2NK$, $(CF_3SO_2)_3CK$, $(CF_3CH_2OSO_2)_3CK$, and $C_4F_9SO_3K$.

As the anion-containing salt having the fluoro group and the sulfonyl group, the above-listed compounds can be used singly or in combination.

It is preferable to add 0.5 to 20 parts by mass of the anion-containing salt having the fluoro group and the sulfonyl group to 100 parts by mass of the EO-PO-AGE copolymer. If the mixing amount of the salt is less than 0.5 parts by mass, the obtained composition is incapable of obtaining a sufficient conductivity. On the other hand, even though the mixing amount of the salt exceeds a certain amount, the conductivity of the obtained composition little changes. More specifically, even if the mixing amount of the salt is more than 20 parts by mass, there is little increase in the effect of improving the conductivity of the obtained composition and yet the production cost increases.

By singly ionizing a part of ions generated from the salt added to the elastomer composition with an anion-adsorbing agent, it is possible to stabilize the electric conduction of the obtained composition and improve the electric conduction thereof when the salt is used in a small amount.

As the anion-adsorbing agent, the following known compounds can be used: Synthesized hydrotalcite containing Mg and Al as its main component; a Mg—Al-containing inorganic ion exchanger, a Sb-containing inorganic ion exchanger, Ca-containing inorganic ion exchanger; and a polymer or a copolymer having ion seats for fixing anions to chains thereto.

For example, synthesized hydrotalcite (trade name: Kyoward 2000, Kyoward 1000 produced by Kyowa Chemical Industry Co., Ltd.), and anion-exchanging ion exchange resin (trade name: Diaion DCA11 produced by Nippon Rensui Co., Ltd.) are listed.

The conductive dynamically crosslinked thermoplastic elastomer composition is mixed with the micro-capsule containing the polymer, having the acrylic group, which forms the outer shell thereof. The dynamically crosslinked thermoplastic elastomer composition mixed with the micro-capsule is capable of keeping the hardness of the obtained composition low even in the low-temperature environment and reducing the conductivity thereof even though the mixing amount of the anion-containing salt having the fluoro group and the sulfonyl group is small.

0.5 to 15 parts by mass of the micro-capsule is mixed with 100 parts by mass of the conductive dynamically crosslinked thermoplastic elastomer composition.

If the mixing amount of the micro-capsule is less than 0.5 parts by mass, the micro-capsule little contributes to a decrease in the hardness of the elastomer composition in the low-temperature environment and in addition, has a very small effect of decreasing the conductivity of the obtained composition when the micro-capsule is used in combination with the salt. On the other hand, if the mixing amount of the micro-capsule is more than 15 parts by mass, the micro-capsule occupies a large volume in the composition constructing the conductive roller of the present invention. Thus there is a possibility that the processability deteriorates and the strength thereof decreases.

It is more favorable that 1 to 7 parts by mass of the micro-capsule is mixed with 100 parts by mass of the conductive dynamically crosslinked thermoplastic elastomer composition.

The micro-capsule of the present invention has the polymer having the acrylic group as the outer shell thereof.

The amount of the acrylic group contained in the micro-capsule is not limited to a specific amount. Favorably not less than 5 parts by mass and more favorably not less than 10 parts by mass of a monomer necessary for generating the acrylic group is contained in 100 parts by mass of the polymer forming the outer shell.

As monomers, having a carboxylic group, which are necessary for generating the acrylic group, it is possible to list unsaturated monocarboxylic acids including acrylic acid, methacrylic acid, ethacrylic acid, crotonic acid, and cinnamic acid; unsaturated dicarboxylic acids such as maleic acid, itaconic acid, fumaric acid; citraconic acid, and chloromaleic acid; monoesters of unsaturated dicarboxylic acid such as monomethyl maleate, monoethyl maleate, monobutyl maleate, monomethyl fumarate, monoethyl fumarate, monomethyl itaconate, monoethyl itaconate, monobutyl itacocate, and derivatives thereof. Above all, the acrylic acid, the methacrylic acid, the itaconic acid, styrene sulfonate, the maleic acid, and the fumaric acid, and the citraconic acid are favorable. These monomers may be used in the form of salts or in combination.

The micro-capsule which is used in the present invention is not restricted to a specific one, but known micro-capsules can be used, provided that they have the polymer, having the acrylic group, which forms the outer shell thereof.

As the micro-capsule which can be used in the present invention, it is possible to exemplify the micro-capsule in which the polymer forming the outer shell thereof is composed of a nitrile monomer, a monomer having carboxylic groups, a monomer having amide groups, a monomer having an annular structure at its side chain, and a monomer (crosslinking agent) having not less than two polymerizable double bonds.

As the composing ratio of the monomers of the polymer, the nitrile monomer is contained at favorably 15 to 75 mass % and more favorably 25 to 65 mass %; the monomer having the carboxylic groups is contained at favorably 10 to 65 mass % and more favorably 20 to 55 mass %; the monomer having the amide groups is contained at favorably 0.1 to 20 mass % and more favorably 1 to 10 mass %; the monomer having the annular structure at its side chain is contained at favorably 0.1 to 20 mass % and more favorably 1 to 10 mass %; and the monomer (crosslinking agent) having not less than two polymerizable double bonds is contained at favorably 0 to 3 mass %.

The polymer composing the outer shell of the micro-capsule may contain inorganic substances. It is preferable that the content of the inorganic substances is in the range of 1 to 25 mass %.

As the nitrile monomer, it is possible to list acrylonitrile, methacrylonitrile, α-chloroacrylonitrile, α-ethoxy acrylonitrile, fumaronitrile, and mixtures of these monomers. The acrylonitrile and/or the methacrylonitrile are especially preferable.

As the monomer having the amide group, acrylamide, methacrylamide, and N,N-dimethylacrylamide, and N,N-dimethylmethacrylamide are listed.

As the monomer having the annular structure at its side chain, styrene, α-methylstyrene, chlorostyrene, isobornyl (metha) acrylate, and cyclohexyl methacrylate are listed. It is also possible to exemplify phenylmaleimide, cyclohexylmaleimide, and the like as the monomer having the annular structure at its side chain.

As the monomer (crosslinking agent) having not less than two polymerizable double bonds, it is possible to list divinylbenzene, ethylene glycol di(metha)acrylate, diethylene glycol di(metha) acrylate, triethylene glycol di(metha)acrylate, PEG#200 di(metha)acrylate, PEG#400 di(metha)acrylate, PEG#600 di(metha)acrylate, triacrylohormar, trimethylolpropane trimethacrylate, allyl methacrylate, 1,3-butyl glycol dimethacrylate, and triallyl isocyanate.

In addition, it is possible to exemplify the micro-capsule in which the polymer forming the outer shell thereof is composed of the nitrile monomer, a monomer having unsaturated double bonds and carboxylic groups in its molecules, the monomer having not less than two polymerizable double bonds, and a monomer copolymerizable with these monomers to adjust the expansion characteristic of the polymer as desired.

As the composing ratio of the monomers of the polymer, the nitrile monomer is contained at favorably 40 to 95 mass % and more favorably 50 to 90 mass %; the monomer having the unsaturated double bonds and the carboxylic groups is contained at favorably 7 to 60 mass % and more favorably 10 to 50 mass %; the monomer having not less than two polymerizable double bonds is contained at favorably 0.05 to 5 mass % and more favorably 0.2 to 3 mass %; and the monomer copolymerizable with these monomers to adjust the expansion characteristic of the polymer is contained at favorably 0 to 20 mass % and more favorably 0 to 15 mass %.

As the nitrile monomer, the monomer having the unsaturated double bonds and the carboxylic groups in its molecule, and the monomer having not less than two polymerizable double bonds, the above-exemplified compounds are listed.

As the monomer copolymerizable with other monomers to adjust the expansion characteristic of the polymer, vinylidene chloride, vinyl acetate, (metha) acrylic ester such as methyl (metha)acrylate, ethyl(metha)acrylate, n-butyl(metha)acrylate, isobutyl(metha)acrylate, t-butyl(metha)acrylate, isobornyl(metha)acrylate, cyclohexyl(metha)acrylate, benzyl(metha)acrylate, and β-carboxyethyl acrylate; styrene monomers such as styrene, styrene sulfonic acid and sodium salts thereof, α-methylstyrene, and chlorostyrene; monomers which progresses polymerization reaction proceeds by a free-radical initiator such as acrylamide, substituted acrylamide, methacrylamide, substituted methacrylamide and mixtures thereof. It is preferable that the monomer copolymerizable with other monomers do not contain a monomer such as N-methylolacrylamide having a functional group which reacts with the carboxylic group.

In addition, it is possible to exemplify the micro-capsule in which the polymer forming the outer shell thereof is composed of the acrylonitrile, the monomer containing the carboxylic group, a monomer having a group which reacts with the carboxylic group of the above-described monomer containing the carboxylic group, the monomer having not less than two polymerizable double bonds or/and a monomer, having a high Tg, which serves as a component adjusting a softening temperature. The monomer having not less than two polymerizable double bonds and the monomer having a high Tg are used as desired.

As the composing ratio of the monomers of the polymer, the acrylonitrile is contained at favorably 20 to 80 mol % and more favorably 30 to 70 mol %; the monomer containing the carboxylic groups is contained at favorably 5 to 40 mol % and more favorably 10 to 30 mol %; the monomer having the group which reacts with the carboxylic group is contained at favorably 1 to 30 mol % and more favorably 2 to 20 mol %; and the monomer having not less than two polymerizable double bonds is contained at favorably 0 to 5 mol % and more favorably 0 to 3 mol %; and the monomer having a high Tg is contained at favorably 0 to 50 mol % and more favorably 10 to 40 mol %.

As the monomer having the carboxylic groups and the monomer having not less than two polymerizable double bonds, the above-exemplified compounds are listed.

As the monomer having the group which reacts with the carboxyl group, it is possible to list N-methylolacrylamide, N-methylolmethacrylamide, glycidyl acrylate, glycidyl methacrylate, 2-hydroxyethyl(metha)acrylate, 2-hydroxypropyl(metha)acrylate, 2-hydroxybutyl(metha)acrylate, 2-hydroxy-3-phenoxypropyl acrylate, N,N-dimethylaminoethyl(metha)acrylate, N,N-dimethylaminopropyl methacrylate, magnesium monoacrylate, and zinc monoacrylate.

As the monomer having a high Tg, it is possible to list homopolymers having the Tg at not less than 80° C. Such monomers include methacrylonitrile, acrylamide, methacrylamide, N,N-dimethylacrylamide, N,N-dimethylmethacrylamide, methyl methacrylate, t-butyl methacrylate, isobornyl (metha)acrylate, cyclohexyl methacrylate, benzyl methacrylate, N-vinylpyrrolidone, and styrene.

In addition, it is possible to exemplify the micro-capsule in which the polymer forming the outer shell thereof is composed of a copolymerized polymer obtained by copolymerization of the nitrile monomer and the monomer containing the carboxylic group; and monovalent through trivalent metal cations which crosslink ions of the copolymerized polymer.

As the composing ratio of the monomers of the polymer, the nitrile monomer is contained at preferably less than 80 mass % to the entire monomers; the monomer containing the carboxylic group is contained at preferably 5 to 50 mass % to the entire monomers; and the ratio of the metal cations to 100 parts by mass of the monomer containing the carboxylic groups is preferably 0.1 to 10 parts by mass.

As the nitrile monomer and the monomer containing the carboxylic group, the above-exemplified compounds are listed. It is preferable that both nitrile monomer and the monomer containing the carboxylic group are radical polymerizable unsaturated monomers.

As "monovalent through trivalent metal cations", it is possible to list potassium cation, sodium cation, cesium cation, lithium cation, magnesium cation, calcium cation, barium cation, iron cation, nickel cation, copper cation, zinc cation, tin cation, chrome cation, lead cation, strontium cation, and aluminum cation.

The "monovalent through trivalent metal cations" are contained in the polymer in the form of metal cation supplier. As the metal cation supplier, it is possible to list hydroxides of the above-described "monovalent through trivalent metal cations"; and salts such as phosphate, carbonate, nitrate, sulfate, chloride, nitrite, sulfite, and salts of organic acids such as octyl acid, stearic acid. More specifically, it is possible to list hydroxides such as sodium hydroxide, potassium hydroxide, lithium hydroxide, zinc hydroxide, nickel hydroxide, iron hydroxide, copper hydroxide, magnesium hydroxide, aluminum hydroxide, calcium hydroxide, and barium hydroxide; chlorides such as sodium chloride, potassium chloride, lithium chloride, magnesium chloride, calcium chloride, barium chloride, zinc chloride, and aluminum chloride; and phosphates such as sodium phosphate, lithium phosphate, calcium phosphate, zinc phosphate, and aluminum phosphate; and carbonates such as potassium carbonate, sodium carbonate, lithium carbonate, calcium carbonate, and zinc carbonate. Above all, hydroxides of transition metals such as zinc hydroxide, nickel hydroxide, iron hydroxide, and copper hydroxide are favorable. Hydroxides of bivalent transition metals are more favorable.

The micro-capsule includes a thermally expansive type and an expanded type. Both types can be used in the present invention.

The thermally expansive micro-capsule contains a low boiling point substance (thermal expansion agent) in its outer shell. When the thermally expansive micro-capsule is heated, the polymer of the outer shell softens and expands owing to vaporization of the low boiling point substance, thus becoming a micro-balloon (hollow spherical particle).

As low boiling point substances contained in the outer shell, those which have softening points not more than that of the thermoplastic resin composing the outer shell and become gaseous are preferable. As the low boiling point substance, it is possible to list low boiling point liquids such as propane, propylene, butene, normal butane, isobutane, isopentane, neopentane, normal pentane, hexane, heptane, petroleum ether, halides of methane, and tetraalkylsilane; and compounds such as AIBN which are thermally decomposed and become gaseous when they are heated. Of these low boiling point substances, low boiling point liquid hydrocarbons such as the isobutane, the normal butane, the normal pentane, and the isopentane can be preferably used. These low boiling point substances can be used singly or in combination.

The coefficient of thermal expansion of the thermally expansive micro-capsule is favorably not less than two and more favorably in the range of 2 to 20.

The expansion start temperature of the thermally expansive micro-capsule is favorably not less than 100° C. and more favorably not less than 130° C. The maximum expansion temperature is favorably not less than 130° C., more favorably not less than 160° C., and most favorably not less than 170° C. The upper limit value of the maximum expansion temperature is not limited to a specific value, but normally about 250° C.

It is preferable that the particle diameter of the micro-capsule is 30 to 300 µm. If the particle diameter is less than 30 µm, the micro-capsule little contributes to a decrease in the hardness of the obtained composition in the low-temperature environment and in addition, has a very small effect of decreasing the conductivity of the obtained composition when the micro-capsule is used in combination with the anion-containing salt having the fluoro group and the sulfonyl group. On the other hand, if the particle diameter is more than 300 µm, the micro-capsule occupies a large volume in the composition constructing the conductive roller of the present invention. Thus there is a possibility that the processability deteriorates and the strength thereof decreases.

The "particle diameter" of the thermally expansive micro-capsule means the particle diameter after it expands.

It is preferable that the micro-capsule which is used in the present invention has a high configuration-holding performance against a load applied thereto. More specifically, when a load of 15 MPa is applied to the micro-capsule, a volume-holding percentage after the load is applied thereto is favorably not less than 50%, more favorably not less than 70%, and most favorably not less than 80%. The volume-holding percentage of the thermally expansive micro-capsule is measured when it is thermally expanded.

The micro-capsule which is used in the present invention can be produced by using a known method and is commercially available. For example, it is possible to selectively use "EXPANCEL (commercial name)" produced by Akzo Nobel and "Matsumoto Microsphere (commercial name)" produced by Matsumoto Yushi-Seiyaku Co., Ltd.

It is preferable to add an ethylene-acrylic ester-glycidyl methacrylate copolymer or an ethylene-acrylic ester-maleic anhydride copolymer to the conductive dynamically crosslinked thermoplastic elastomer composition. By so doing, it is possible to improve the dispersibility of the components of the conductive dynamically crosslinked thermoplastic elastomer composition and especially the anion-containing salt having the fluoro group and the sulfonyl group contained therein and improve the compatibility of the micro-capsule with the conductive dynamically crosslinked thermoplastic elastomer composition.

As the acrylic ester in the ethylene-acrylic ester-glycidyl methacrylate copolymer or the ethylene-acrylic ester-maleic anhydride copolymer, it is possible to list esterified substances produced by the reaction between alcohol and acrylic acid such as methyl acrylate, ethyl acrylate, propyl acrylate, butyl acrylate, 2-ethylhexyl acrylate. The methyl acrylate and the ethyl acrylate are favorable.

The content ratio of the acrylic ester to the copolymer is favorably in the range of 0.1 to 30 mass %, more favorably in the range of 1 to 20 mass %, and most favorably in the range of 5 to 15 mass %. The content ratio of the glycidyl methacrylate or the maleic anhydride to the copolymer is in the range of 0.05 to 20 mass %, favorably in the range of 0.1 to 15 mass %, more favorably in the range of 0.5 to 10 mass %, and most favorably in the range of 1 to 10 mass %.

As the compatibilizing agent, one or two kinds of terpolymers corresponding to the definition described below may be used together with the above-described two kinds of the copolymers.

The terpolymer serving as the compatibilizing agent is composed of an olefin component (c1), acrylic ester or methacrylic ester (c2), and an unsaturated carboxylic unit (c3).

As the olefin component (c1), it is possible to list ethylene hydrocarbons having 2 to 6 carbon atoms such as ethylene, propylene, isobutylene, 1-butene, 1-pentene, and 1-hexene.

As examples of the component (c2) of the acrylic ester or the methacrylic ester, it is possible to list esterified substances produced by the reaction between alcohol and acrylic acid or methacrylic acid such as methyl acrylate, methyl methacrylate, ethyl acrylate, ethyl methacrylate, propyl acrylate, propyl methacrylate, butyl acrylate, butyl methacrylate, 2-ethylhexyl acrylate, 2-ethylhexyl methacrylate. Of these acrylic esters or the methacrylic esters, the methyl acrylate, the methyl methacrylate, the ethyl acrylate, and the ethyl methacrylate are preferable.

The unsaturated carboxylic acid unit (c3) is introduced by unsaturated carboxylic acid or anhydrides thereof. More specifically, it is possible to list acrylic acid, methacrylic acid, maleic acid, maleic anhydride, itaconic acid, itaconic anhydride, fumaric acid, crotonic acid, half ester and half amide of unsaturated dicarboxylic acid. Above all, the acrylic acid, the methacrylic acid, the maleic acid, and the maleic anhydride are favorable. The maleic anhydride is especially favorable. The mode of the unsaturated carboxylic acid unit is not limited to a specific mode, provided that it is copolymerized with the above-described terpolymer. It is possible to exemplify a random copolymer, a block copolymer, and a graft copolymer.

The content of the acrylic ester or the methacrylic ester (c2) is set to favorably 0.1 to 30 mass %, more favorably 1 to 20 mass %, and most favorably 5 to 15 mass %. The content of the unsaturated carboxylic unit (c3) is set to 0.05 to 20 mass %, favorably 0.1 to 15 mass %, more favorably 0.5 to 10 mass %, and most favorably 1 to 10 mass %.

It is preferable that the mixing amount of the compatibilizing agent is 1 to 20 parts by mass for 100 parts by mass of the rubber component contained in the elastomer composition.

If the mixing amount of the compatibilizing agent is less than 1 part by mass, the compatibilizing agent is not sufficiently effective. Thus the elastomer composition, the EO-PO-AGE copolymer, the anion-containing salt having the fluoro group and the sulfonyl group, and the micro-capsule do not favorably mix with one another. Thereby the composition is not uniform and the components cannot be processed favorably. On the other hand, if the mixing amount of the compatibilizing agent is more than 20 parts by mass, the compatibilizing effect is not improved further but the obtained composition has a high hardness.

The conductive roller of the present invention can be produced by using conventional methods. For example, the conductive roller is produced by using the following method.

Initially, the composition composing the conductive roller of the present invention is formed. The producing steps are described in detail below.

The obtained composition is extruded tubularly by using an extruder and cut to obtain the conductive roller. It is also possible to inject an obtained pellet of the composition by using an injection molder, mold it tubularly, polish the surface of the molding, and cut the tube to a predetermined size. Thereby the conductive roller is obtained. In the present invention, a extrusion molding method can be preferably used because the method is capable of producing the tube successively and does not require a polishing step, thereby improving productivity considerably.

The conductive roller of the present invention has a columnar shaft and one cylindrical conductive layer, composed of the above-described composition, which is disposed on the periphery of the shaft. This construction is simple and preferable from an industrial point of view. But the conductive roller may have two or three layers in addition to the above-described conductive layer to adjust the electric resistance thereof. It is possible to appropriately set the kind of each layer, a layering order, and the thickness of each layer according to demanded performance. It is preferable to dispose the above-described conductive layer as the outermost layer of the conductive roller.

It is possible to form an oxide film on the surface of the conductive roller of the present invention by irradiating the surface thereof with ultraviolet rays. The oxide film serving as a dielectric layer decreases the loss tangent of the conductive roller. The oxide film also serving as a low-friction layer provides a favorable toner separation effect.

A coating layer may be formed on the surface of the conductive roller. For example, the coating layer can be formed by selecting a known coating material made of a main polymer consisting of urethane, acrylic resin or rubber latex and fluororesin dispersed in the main polymer. Coating treatment is performed by using a known method such as electrostatic deposition, spray coating, dipping or brush paint. It is preferable that the thickness of the coating layer is 1 to 20 µm. By coating the surface of the conductive roller with the coating material, it is possible to obtain the effect of easily scraping toner which has remained at a transfer time, changing the attaching and removing properties of toner, controlling the surface energy, preventing paper powder from attaching to the surface of the conductive roller and the toner from sticking thereto, and decreasing the coefficient of friction of the surface thereof.

The method of producing the composition composing the conductive roller of the present invention is described in detail below.

The method of producing the composition is not specifically limited, but known methods can be used. All components contained in the composition may be kneaded all together. Alternatively it is possible to knead the components at a plurality of steps. That is, after a part of all the components is kneaded, the remaining components are kneaded. But it is preferable to produce the composition by the following method.

Initially the rubber component containing at least one of the diene rubber and the EPDM rubber is dynamically crosslinked by the crosslinking agent to disperse the rubber component in the mixture of the thermoplastic elastomer and the thermoplastic resin.

The anion-containing salt having the fluoro group and the sulfonyl group is added to the EO-PO-AGE copolymer and they are kneaded.

The obtained elastomer composition, the obtained conductive composition, the compatibilizing agent and additives which is used as desired, are kneaded to form the conductive dynamically crosslinked thermoplastic elastomer composition. Thereafter the micro-capsule is mixed with the conductive dynamically crosslinked thermoplastic elastomer composition to form the composition composing the conductive roller.

The conductive composition has a characteristic that it hardly enters a dynamically crosslinked domain phase, but is selectively mixed into a matrix phase. Thus according to the above-described method, the conductive composition is selectively disposed in the matrix of the elastomer composition. That is, the conductive composition can be locally present in the thermoplastic resin or/and the thermoplastic elastomer serving as the matrix of the elastomer composition. Consequently the conductive composition added to the elastomer composition does not adversely affect a crosslinking degree of the rubber. Thus it is possible to suppress an increase of the compression set. Further it is unnecessary to increase the usage of the anion-containing salt having the fluoro group and the sulfonyl group. Therefore it is possible to prevent an increase in the hardness of the obtained composition and reduce the material cost.

The producing following two methods can be used to dynamically crosslink the EO-PO-AGE copolymer.

In the first method, as the crosslinking agent, preferably the peroxide is added to the mixture of the components. More specifically, by kneading the obtained elastomer composition, the obtained conductive composition, the micro-capsule, the crosslinking agent, and the compatibilizing agent and additives used as desired, it is possible to mix the components and at the same time dynamically crosslink the EO-PO-AGE copolymer contained in the conductive composition with preferably the peroxide as the crosslinking agent.

In the second method, in kneading the EO-PO-AGE copolymer and the anion-containing salt having the fluoro group and the sulfonyl group, preferably the peroxide is added to the mixture as the crosslinking agent to dynamically crosslink the EO-PO-AGE copolymer in advance.

It is preferable that the heating temperature at which the rubber component and/or the EO-PO-AGE copolymer is dynamically crosslinked is set to 160 to 250° C. and that the heating period of time is 1 to 20 minutes. It is preferable that the heating temperature at which the components are mixed with one another is set to 160 to 250° C. and that the heating period of time is set to 1 to 20 minutes. A twin screw extruder, a Banbury mixer, a kneader or the like is used for the dynamic crosslinking and the kneading.

The rubber component and/or the EO-PO-AGE copolymer may be dynamically crosslinked in the presence of halogen, namely, chlorine, bromine, fluorine or iodine. To allow the halogen to be present at the dynamic crosslinking time, it is favorable that the elastomer composition contains a halogenated resin crosslinking agent or a halogen-donating substance. As the halogen-donating substance, tin chloride such as stannic chloride, iron chloride, and cupric chloride are listed. The halogen-donating substance can be used singly or in combination of two or more of them.

It is preferable to pelletize the composition obtained by carrying out the above-described method to facilitate processing to be performed at subsequent steps. Thereby it is possible to obtain a preferable moldability.

The conductive roller of the present invention is used for various purposes. The conductive roller can be used very favorably as a conductive member of an image-forming apparatus such as a printer, an electrostatic copying machine, a facsimile apparatus, an ATM, and the like. More specifically, the conductive roller is used as a charging roller for uniformly charging a photoreceptor drum, a developing roller for attaching toner to the photoreceptor, a transfer roller for transferring a toner image to paper or an intermediate transfer belt from the photoreceptor, a toner supply roller for transporting the toner, a driving roller for driving a transfer belt from the inner side thereof, a paper-feeding roller (more specifically, paper supply roller, transport roller or paper discharge roller constructing paper supply mechanism) contributing to the transport of the paper, and a cleaning roller for removing residual toner. It is preferable to use the conductive roller of the present invention as the transfer roller.

Because the conductive roller of the present invention contains the micro-capsule composed of the polymer, having the acrylic groups, which forms the outer shell thereof, the conductive roller is capable of keeping a low hardness even in the low-temperature environment. Thereby an image-forming apparatus using the conductive roller of the present invention is capable of forming a favorable image without giving rise to defective transfer, electric charge, and transport even in the low-temperature environment. In addition, the composition of the conductive roller has a favorable moldability without sacrificing the processability in decreasing the hardness of the conductive roller.

It is possible to effectively decrease the electric resistance of the conductive roller of the present invention by adding the anion-containing salt having the fluoro group and the sulfonyl group, the micro-capsule, and the EO-PO-AGE copolymer to the elastomer composition. Because it is possible to make the mixing amount of the ionic-conductive agent smaller than that used in the composition composing the conventional conductive roller, it is possible to decrease variations in the electric resistance thereof, restrain bleeding from occurring, prevent deterioration of mechanical properties thereof such as the compression set, hardness, and the like, and decrease the material cost.

In the conductive roller of the present invention, the rubber component containing at least one of the diene rubber and the EPDM rubber is dynamically crosslinked and dispersed in the mixture of the thermoplastic elastomer and the thermoplastic resin. Therefore the conductive roller has rubber-like durability, elasticity, and flexibility, and resin-like moldability. Further the conductive roller is thermoplastic and recyclable.

DETAILED DESCRIPTION OF THE PREFERRED EMBODIMENTS

Figure 1:
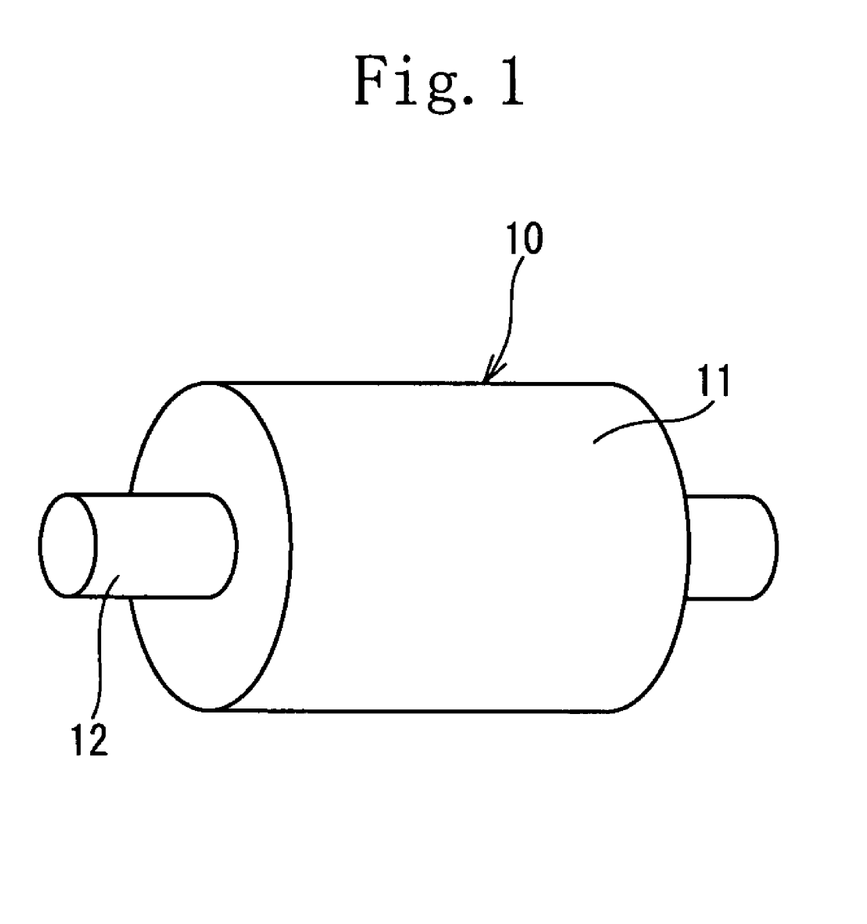

An embodiment of the conductive roller of the present invention is shown in FIG. 1.

The conductive roller 10 is composed of a cylindrical roller part 11 made of the composition described below and a columnar shaft 12. The thickness of the roller part 11 is favorably 1 to 20 mm and more favorably 2 to 20 mm. If the thickness of the roller part 11 is less than 1 mm, the roller part 11 is short of elasticity. If the thickness thereof exceeds 20 mm, the conductive roller is so large that it is difficult to mount the conductive roller on a copying apparatus, a printer, and the like. The shaft 12 may be made of metal such as aluminum, aluminum alloy, SUS, and iron or ceramic.

It is possible to produce an approximately D-shaped rubber roller by inserting an approximately D-shaped shaft into the hollow portion of the cylindrically shaped roller part 11 by press fit.

A coating layer (not shown) may be formed on the surface of the conductive roller 10.

The Shore A hardness the conductive roller of the present invention specified in JIS K6253 is in the range of 20 to 40, favorably in the range of 20 to 35, and more favorably in the range of 25 to 35 at 23° C. By setting the hardness of the conductive roller 10 at 23° C. to this specified range, it is possible to prevent the generation of a defective image at a low temperature not more than 15° C., because the hardness does not increase.

Various properties of the conductive roller 10 other than the hardness can be adjusted according to use. For example, the electric resistance value of the conductive roller 10 when a voltage of 1000V is applied thereto is favorably $10^{4.0}\Omega$ to $10^{9.0}\Omega$ and more favorably $10^6\Omega$ to $10^8\Omega$.

The composition composing the conductive roller of the present invention is described below.

The composition contains an elastomer composition containing a mixture of an olefin resin and a styrene thermoplastic elastomer, in which the EPDM rubber is dynamically crosslinked and dispersed; an EO-PO-AGE copolymer; an anion-containing salt having a fluoro group and a sulfonyl group; a micro-capsule having a polymer, having an acrylic group, which forms an outer shell thereof; and an ethylene-acrylic ester-maleic anhydride copolymer which is used as desired.

The EO-PO-AGE copolymer may be dynamically crosslinked.

In the elastomer composition of the embodiment, polypropylene is used as the olefin resin, and a styrene-ethylene-ethylene/propylene-styrene copolymer (SEEPS) is used as the styrene thermoplastic elastomer. Regarding the mixing ratio between the olefin resin and the styrene thermoplastic elastomer, 30 to 50 parts by mass of the former is mixed with 100 parts by mass of the latter.

The mixture of the thermoplastic elastomer and the thermoplastic resin is used at 20 to 120 parts by mass, favorably 40 to 100 parts by mass, and more favorably 50 to 90 parts by mass for 100 parts by mass of the EPDM rubber.

The EPDM rubber is dynamically crosslinked by a resin crosslinking agent.

As the resin crosslinking agent, halogenated alkylphenol is especially preferable. The mixing amount of the resin crosslinking agent is set to 5 to 15 and preferably 10 to 15 parts by mass for 100 parts by mass of the EPDM.

To properly accomplish the dynamic crosslinking reaction, zinc oxide is used together with the resin crosslinking agent as a crosslinking assistant. The mixing amount of the crosslinking assistant is favorably not less than 0.5 nor more than 10 parts by mass and more favorably not less than one nor more than 10 parts by mass for 100 parts by mass of the EPDM rubber.

In the EO-PO-AGE copolymer used in the embodiment, the content ratio of the ethylene oxide, the propylene oxide, and the allyl glycidyl ether is 80 to 95 mol %, 1 to 10 mol %, and 1 to 10 mol %. It is especially favorable that the number-average molecular weight of the EO-PO-AGE copolymer is not less than 50,000.

The mixing amount of the EO-PO-AGE copolymer for 100 parts by mass of the EPDM rubber is favorably 3 to 20 parts by mass and more favorably 5 to 15 parts by mass.

The EO-PO-AGE copolymer may be dynamically crosslinked.

It is preferable to use a peroxide in the dynamic crosslinking. It is preferable use di(tert-butyl peroxy)di-isopropylbenzene as the peroxide. It is preferable to set the mixing amount of the peroxide to 0.5 to 3 parts by mass for 100 parts by mass of the EO-PO-AGE copolymer.

A co-crosslinking agent may be used together with the peroxide. As the co-crosslinking agent, dioximes are favorable. N,N'-m-phenylenebismaleimide is more favorable. The mixing ratio of the co-crosslinking agent for 100 parts by mass of the EO-PO-AGE copolymer is favorably 0.1 to 5 parts by mass and more favorably 0.2 to 2 parts by mass.

As the anion-containing salt having the fluoro group and the sulfonyl group, the salts containing the anions shown by the above-described chemical formula 1 or 2 are favorable. The salt having an anion in which the functional groups shown by $X_1$-$X_3$ in the chemical formula 1 or 2 are $CF_3SO_2$— is more favorable.

The cation which makes a pair with the anion to form the salt is favorably the alkali metal and more favorably lithium ions.

More specifically, bis(trifluoromethanesulfonyl)imide lithium is especially favorable as the above-described salt.

The mixing ratio of the anion-containing salt having the fluoro group and the sulfonyl group for 100 parts by mass of the EO-PO-AGE copolymer is 1 to 20 parts by mass and favorably 5 to 15 parts by mass.

It is preferable that the micro-capsule containing the polymer, having the acrylic group, which forms the outer shell thereof comprises an acrylic copolymer formed by polymerization by using methacrylic acid or acrylic acid as a monomer having carboxyl group.

It is preferable that the micro-capsule is the thermally expansive micro-capsule. More specifically, it is preferable that the micro-capsule contains liquid hydrocarbon as a low boiling point substance in the outer shell.

The micro-capsule which is used in the present invention has an expansion start temperature at not less than 110° C. and favorably in the range of 110 to 160° C. and more favorably 130 to 140° C. and the maximum expansion temperature in the range of 150° C. to 200° C. and more favorably in the range of 180° C. to 190° C.

The particle diameter of the expanded micro-capsule is favorably 50 to 150 µm and more favorably 80 to 100 µm.

The composition composing the conductive roller 10 may contain the ethylene-acrylic ester-maleic anhydride copolymer as a compatibilizing agent.

As the acrylic ester of the ethylene-acrylic ester-maleic anhydride copolymer, methyl acrylate or ethyl acrylate is used. It is especially favorable to use the ethyl acrylate. Regarding the content ratio of the monomers of the ethylene-acrylic ester-maleic anhydride copolymer, the content of the acrylic ester is set to 3 to 10 mass %, and that of the maleic anhydride is set to 1 to 5 mass %. The melt flow rate of the copolymer is favorably 0.5 to 100 g/10 minutes and more favorably 1 to 50 g/10 minutes.

The mixing ratio of the compatibilizing agent is set to favorably 3 to 15 parts by mass and more favorably 5 to 10 parts by mass for 100 parts by mass of the EPDM rubber.

The composition composing the conductive roller 10 may contain components other than the above-described components so long as the use thereof is not contradictory to the object of the present invention.

For example, the elastomer composition may contain a softener to allow the composition to be appropriately flexible and elastic.

As the softener, oil and plasticizer can be used. As the oil, it is possible to use mineral oil such as paraffin oil, naphthenic oil and aromatic oil, known synthetic oil composed of hydrocarbon oligomer, and process oil. As the synthetic oil, it is possible to use oligomer of $\alpha$-olefin, oligomer of butene, and amorphous oligomer of ethylene and $\alpha$-olefin. It is possible to use plasticizers such as phthalates, adipates, sebacates, phosphates, polyethers, and polyesters. More specifically it is possible to list dioctyl phthalate (DOP), dibutyl phthalate (DBP), dioctyl sebacate (DOS), and dioctyl adipate (DOA).

The paraffin oil is favorable as the softener. The paraffin process oil is more favorable.

The mixing amount of the softener is set to 50 to 250 parts by mass, favorably 50 to 200 parts by mass, and more favorably 70 to 150 parts by mass for 100 parts by mass of the rubber component of the elastomer composition.

If the mixing amount of the softener is less than the above-described lower limit value, it is difficult to obtain the effect to be brought about by the addition of the softener, namely, the effect of improving the dispersibility of the rubber component at a dynamic crosslinking time and in addition the composition is liable to have a high hardness. On the other hand, if the mixing amount of the softener is more than the above-described upper limit value, the softener inhibits a crosslinking operation. Consequently the rubber component cannot be sufficiently dynamically crosslinked and hence the obtained composition has deteriorated properties. In addition, the softener is liable to bleed.

The above-described mixing amount of the softener includes the amount of extended oil when oil-extended rubber is used as the rubber component.

A filler and other additives may be used to improve the mechanical strength of the composition.

As the filler, it is possible to use powder of silica, carbon black, clay, talc, calcium carbonate, dibasic phosphite (DLP), basic magnesium carbonate, and alumina.

It is preferable to use not more than 15 mass % of the filler for the entire mass of the composition composing the conductive roller of the present invention. The above-described mixing range is set for the reason described below. The filler is effective for improving the tensile strength and tearing strength of the composition. But if the filler is used in a very large amount, the flexibility of the composition deteriorates. Consequently the conductive roller composed of the composition has a low coefficient of friction.

The elastomer composition composing the conductive roller of the present invention may contain additives such as an age resistor, an antioxidant, an ultraviolet ray-absorbing agent, a lubricant, a pigment, an antistatic agent, a flame retardant, a neutralizer, a nucleating agent, and an agent for preventing the generation of air-bubbles.

The conductive roller 10 is produced by carrying out the method described below.

Initially the EPDM rubber is pelletized. The pelletized EPDM rubber, the styrene thermoplastic elastomer, the olefin resin, the crosslinking agent, and the softener are kneaded at 200° C. to dynamically crosslink the EPDM rubber with the crosslinking agent so that the EPDM rubber is dispersed in the mixture of the styrene thermoplastic elastomer and the olefin resin. Thereby the elastomer composition is formed.

Separately from the above-described step, the EO-PO-AGE copolymer and the anion-containing salt having the fluoro group and the sulfonyl group are kneaded to form the conductive composition. In case of dynamically crosslinking the EO-PO-AGE copolymer, the EO-PO-AGE copolymer and the peroxide are kneaded together.

The obtained elastomer composition, the obtained conductive composition, and the compatibilizing agent which is used as desired are kneaded at 200° C. to form the conductive dynamically crosslinked thermoplastic elastomer composition. In consideration of handleability in subsequent steps, the conductive dynamically crosslinked thermoplastic elastomer composition is pelletized.

The obtained pellet of the conductive dynamically crosslinked thermoplastic elastomer composition and the micro-capsule were dry-blended by using a tumbler to obtain the composition composing the conductive roller of the present invention. Thereafter the composition was extruded tubularly at 180 to 230° C. by using a single screw extruder. By inserting the metal shaft 12 into the hollow portion of the obtained tube by press fit or bonding the shaft 12 and the tube to each other, the conductive roller 10 of the present invention is obtained. Coating (not shown) may be applied to the surface of the conductive roller 10.

EXAMPLES

Examples of the present invention and comparison examples are described in detail below.

The conductive roller of the each of the examples and the comparison examples was formed by using the components mixed with one another at the ratios shown in table 1. The extrusion processability of each of the conductive rollers, the hardness thereof, and the print performance thereof at normal and low temperatures were evaluated by using a method described later. Table 1 shows evaluated results.

TABLE 1

|  | Example 1 | Example 2 | Example 3 | Comparison Example 1 |
|---|---|---|---|---|
| EPDM rubber | 100 | 100 | 100 | 100 |
| Thermoplastic elastomer | 50 | 50 | 50 | 50 |
| Thermoplastic resin | 20 | 20 | 20 | 20 |
| Softener | 100 | 100 | 100 | 100 |
| Crosslinking agent | 12 | 12 | 12 | 12 |
| Crosslinking assistant | 5 | 5 | 5 | 5 |
| EO-PO-AGE copolymer | 10 | 10 | 10 | 0 |

TABLE 1-continued

|  | Example 1 | Example 2 | Example 3 | Comparison Example 1 |
|---|---|---|---|---|
| Salt | 1 | 1 | 1 | 0 |
| Ethylene-Acrylic ester-maleic anhydride | 0 | 8 | 0 | 0 |
| Total mass of conductive dynamically crosslinked thermoplastic elastomer composition | 298 | 306 | 298 | 287 |
| Micro-capsule | 10 | 10 | 20 | 0 |
| Mixing ratio (%) of micro-capsule | 3.4 | 3.3 | 6.7 | 0.0 |
| Extrusion processability | ○ | ○ | Δ | ○ |
| Hardness | 34 | 34 | 28 | 50 |
| Evaluation of print at normal temperature | ○ | ○ | ○ | X |
| Evaluation of print at low temperature | ○ | ○ | ○ | X |

|  | Comparison Example 2 | Comparison Example 3 | Comparison Example 4 | Comparison Example 5 |
|---|---|---|---|---|
| EPDM rubber | 100 | 100 | 100 | 100 |
| Thermoplastic elastomer | 50 | 50 | 50 | 75 |
| Thermoplastic resin | 20 | 20 | 20 | 20 |
| Softener | 100 | 100 | 100 | 300 |
| Crosslinking agent | 12 | 12 | 12 | 12 |
| Crosslinking assistant | 5 | 5 | 5 | 5 |
| EO-PO-AGE copolymer | 10 | 10 | 10 | 10 |
| Salt | 1 | 0 | 1 | 1 |
| Ethylene-Acrylic ester-maleic anhydride | 0 | 0 | 0 | 0 |
| Total mass of conductive dynamically crosslinked thermoplastic elastomer composition | 298 | 297 | 298 | 523 |
| Micro-capsule | 0 | 10 | 1 | 0 |
| Mixing ratio (%) of micro-capsule | 0.0 | 3.4 | 0.3 | 0.0 |
| Extrusion processability | ○ | ○ | Δ | X |
| Hardness | 48 | 35 | 47 | (36) |
| Evaluation of print at normal temperature | ○ | Δ | ○ | — |
| Evaluation of print at low temperature | X | X | X | — |

The following products were used as the components shown in table 1.

EPDM rubber: "Esprene 505A (commercial name)" produced by Sumitomo Chemical Co, Ltd.

Thermoplastic elastomer: hydrogenated styrene thermoplastic elastomer ("Septon 4077(commercial name)" produced by Kuraray Co., Ltd.)

Thermoplastic resin: polypropylene ("NOVATEC PP (commercial name)" produced by Japan Polypropylene Corporation)

Softener: paraffin process oil: "Diana process oil PW-380 (commercial name)" produced by Idemitsu Kosan Co., Ltd.

Crosslinking agent: phenol resin crosslinking agent ("TACKROL 250-III (commercial name)" produced by TAOKA CHEMICAL CO., LTD.)

Crosslinking assistant: zinc white ("Zinc White No. 1(commercial name)" produced by Mitsui Mining and Smelting Co., Ltd.)

EO-PO-AGE copolymer: ("Zeospan 8100(commercial name)" produced by Zeon Corporation)

Salt: bis(trifluoromethanesulfonyl)imide lithium

Ethylene-acrylic ester-maleic anhydride copolymer: "Bondine LX4110" produced by Arkema Inc.

Micro-capsule: "Matsumoto Micro-sphere F-100 (commercial name)" produced by Matsumoto Yushi-Seiyaku Co., Ltd.

The conductive rollers of the examples and the comparison examples were produced at production steps described below.

Examples 1 Through 3

The pelletized EPDM, the styrene thermoplastic elastomer, the polypropylene resin, the softener, the crosslinking agent, and crosslinking assistant were mixed with one another at the mixing ratio shown in the tables. After the components were dry-blended by a tumbler, the components were kneaded at 200 rpm and at 200° C. by using a twin screw extruder ("HTM 38" produced by I-pec Inc.) to form a pellet of the elastomer composition.

Separately from the pelletized elastomer composition, after the pelletized EO-PO-AGE copolymer and the anion-containing salt having the fluoro group and the sulfonyl group were dry-blended by using the tumbler, the mixture was kneaded by using a twin screw extruder ("2TR-75 type" produced by MORIYAMA COMPANY LTD.) at 70° C. to form a pellet of the conductive composition.

The obtained pellet of the elastomer composition, the pellet of the conductive composition obtained separately from the pellet of the elastomer composition, and the ethylene-acrylic ester-maleic anhydride copolymer (example 2) were used at the rate shown in the table 1. After the components were dry-blended by using the tumbler, the components were kneaded at 200 rpm and at 200° C. by using the twin screw extruder ("HTM 38" produced by I-pec Inc.) to form a pellet of the conductive dynamically crosslinked thermoplastic elastomer composition.

After the obtained pellet of the conductive dynamically crosslinked thermoplastic elastomer composition and the micro-capsule were dry-blended by using the tumbler, the mixture was extruded tubularly at 20 rpm and 200° C. by using a single screw extruder (ϕ50 extruder produced by San.NT Inc.) to obtain a molding having an outer diameter of 14 mm and an inner diameter of 6 mm.

After the metal shaft was inserted into the hollow portion of the obtained tube, it was cut in the length of 218 mm. Thereafter the cut piece was polished to obtain the conductive roller of the present invention.

Comparison Example 1

An elastomer composition formed in the same manner as that used in the example 1 was extruded to obtain a conductive roller.

Comparison Examples 2 and 5

Except that the micro-capsule was not used, a conductive roller of each of the comparison examples 2 and 5 was obtained in the same manner as that used in the example 1. The composition ratio of the elastomer composition of the comparison example 5 was altered.

Comparison Example 3

The elastomer composition formed in the same manner as that used in the example 1, the pelletized EO-PO-AGE copolymer, and the micro-capsule were used. A conductive roller was obtained in the same manner as that used in the example 1. The salt was not used.

Comparison Example 4

Except that the mixing amount of the micro-capsule was set to 1/10, a conductive roller was obtained in the same manner as that used in the example 1.

A method of testing the conductive rollers is shown below.

Extrusion Processability

The pellet of the composition composing the conductive roller was extruded tubularly by using a single screw extruder to check the configuration (surface of rubber) of each tube visually.

◯: The surface of the tube was smooth and had no problems.

Δ: The surface of the tube was irregular to some extent but is acceptable when the extrusion condition is altered and a polishing area thereof is increased.

X: The surface of the tube was so irregular that it broke while the pellet was being extruded and hence could not be shaped into a tube.

Hardness

The hardness of each conductive roller was measured at an atmospheric temperature of 23° C. in accordance with JIS K6253.

Evaluation of Printing Performance at Normal Temperature

Each of the conductive rollers of the examples and the comparison examples was mounted on a laser printer ("Laser Jet 4050" manufactured by Hewlett-Packard Development Company) as a transfer roller. Halftone printing was performed on 20 sheets of paper of size A4 (PPC paper produced by Fuji Xerox Office Supply Co., Ltd.) at a temperature of 23° C. and a relative humidity of 55%. Print made on the sheets of paper was visually checked.

◯: Defective print was not observed and thus had no problems.

Δ: Defective print was observed in one to two sheets of paper. But the degree of defectiveness was so slight that the defective print cannot be recognized unless the print was carefully checked and hence had no problems.

X: Apparent defective print was observed in almost all of the printed sheets of paper.

Evaluation of Printing Performance at Low Temperature

Print was checked in the same manner as that used at the normal temperature except that the temperature and the relative humidity were altered to 10° C. and 20% respectively.

The conductive roller of the comparison example 1 not containing the EO-PO-AGE copolymer, the anion-containing salt having the fluoro group and the sulfonyl group, the ethylene-acrylic ester-maleic anhydride copolymer, and the micro-capsule containing the polymer, having the acrylic group, which forms the outer shell thereof was superior in extrusion processability. But defective print was observed at normal and low temperatures because the conductive roller of the comparison example 1 had a high hardness and the electric resistance thereof was not decreased to a sufficient extent.

The conductive roller of the comparison example 2 not containing the ethylene-acrylic ester-maleic anhydride copolymer and the micro-capsule containing the polymer, having the acrylic group, which forms the outer shell thereof was superior in the extrusion processability. But the conductive roller of the comparison example 2 had a high hardness and thus defective print was observed at the low temperature. The composition, composing the conductive roller of the comparison example 5, which contained the softener in a larger amount than the composition of the conductive roller of the comparison example 2 was so inferior in the extrusion processability that the composition of the comparison example 5 could not be shaped into a tube.

The conductive roller of the comparison example 3 not containing the anion-containing salt having the fluoro group and the sulfonyl group and the ethylene-acrylic ester-maleic anhydride copolymer was superior in the extrusion processability and had a sufficiently low hardness. But the electric resistance of the conductive roller was not decreased to a sufficient extent and thus conspicuous defective print was observed at the low temperature.

The conductive roller of the comparison example 4 which contained a very small amount of the micro-capsule containing the polymer, having the acrylic group, which forms the outer shell thereof had a high hardness and thus defective print was observed at the low temperature.

On the other hand, each of the conductive rollers of the examples 1 through 3 was excellent in the extrusion processability, had a sufficiently low hardness, and had a low electric resistance. Further because the components of the composition of each conductive roller were uniformly dispersed, favorable print could be made at normal and low temperatures without damaging the extrusion processability.

What is claimed is:

1. A conductive roller produced by molding a composition comprising:
    an elastomer composition composed of a rubber component containing at least one of diene rubber and ethylene-propylene-diene rubber and a mixture of a thermoplastic elastomer and a thermoplastic resin, said rubber component being dynamically crosslinked and dispersed in said mixture;
    an ethylene oxide-propylene oxide-allyl glycidyl ether and an anion-containing salt having fluoro groups and sulfonyl groups, both of which are added to said elastomer composition to form a conductive dynamically crosslinked thermoplastic elastomer composition; and
    a micro-capsule composed of a polymer, having acrylic groups, which forms an outer shell thereof, said micro-capsule being mixed with said conductive dynamically crosslinked thermoplastic elastomer composition,
    wherein Shore A hardness of said conductive roller specified in JIS K6253 is not more than 40 at 23° C.

2. The conductive roller according to claim 1, comprising an extruded molding.

3. The conductive roller according to claim 1, wherein 0.5 to 15 parts by mass of the micro-capsule containing a polymer, having said acrylic groups, which forms an outer shell thereof is mixed with 100 parts by mass of said conductive dynamically crosslinked thermoplastic elastomer composition.

4. The conductive roller according to claim 2, wherein 0.5 to 15 parts by mass of the micro-capsule containing a polymer, having said acrylic groups, which forms an outer shell thereof is mixed with 100 parts by mass of said conductive dynamically crosslinked thermoplastic elastomer composition.

5. The conductive roller according to claim 1, wherein said conductive dynamically crosslinked thermoplastic elastomer composition further contains an ethylene-acrylic ester-glycidyl methacrylate copolymer or an ethylene-acrylic ester-maleic anhydride copolymer as a compatibilizing agent.

6. The conductive roller according to claim 2, wherein said conductive dynamically crosslinked thermoplastic elastomer composition further contains an ethylene-acrylic ester-glycidyl methacrylate copolymer or an ethylene-acrylic ester-maleic anhydride copolymer as a compatibilizing agent.

7. The conductive roller according to claim 3, wherein said conductive dynamically crosslinked thermoplastic elastomer composition further contains an ethylene-acrylic ester-glycidyl methacrylate copolymer or an ethylene-acrylic ester-maleic anhydride copolymer as a compatibilizing agent.

8. The conductive roller according to claim 1, used as a transfer roller in an image-forming apparatus.

9. The conductive roller according to claim 2, used as a transfer roller in an image-forming apparatus.

10. The conductive roller according to claim 3, used as a transfer roller in an image-forming apparatus.

* * * * *